Feb. 14, 1928.

J. L. QUINN 1,659,047

SELF CLOSING CRANK CASE DRAINAGE PLUG

Filed Feb. 9, 1926

Inventor
John L. Quinn
By Lyon & Lyon
Attorneys

Patented Feb. 14, 1928.

1,659,047

UNITED STATES PATENT OFFICE.

JOHN L. QUINN, OF SAN FRANCISCO, CALIFORNIA, ASSIGNOR, BY MESNE ASSIGNMENTS, TO STANDARD OIL COMPANY OF CALIFORNIA, OF SAN FRANCISCO, CALIFORNIA, A CORPORATION OF DELAWARE.

SELF-CLOSING CRANK-CASE DRAINAGE PLUG.

Application filed February 9, 1926. Serial No. 87,027.

This invention relates to self-closing crank case drainage plugs and more particularly to a drainage plug adapted for use in connection with a system and apparatus for discharging lubricant from motor vehicles, as specifically disclosed in the co-pending application of Henry D. Collier, filed February 9, 1924, Serial No. 691,861.

It is an object of this invention to provide a simple and inexpensive self-closing crank case drainage plug for use in draining lubricant from the crank case of a motor vehicle.

Another object of this invention is to provide a self-closing crank case drainage plug adapted to be connected or attached to a lubricant reservoir of a motor vehicle engine at or near the lowest point thereof.

Another object of this invention is to provide a self-closing crank case drainage plug adapted to be connected or attached to the lubricant reservoir of a motor vehicle engine that will not materially decrease the road clearance thereof.

Another object of this invention is to provide a self-closing crank case drainage plug adapted to be attached to the lubricant reservoir of a motor engine at or near its lowest point and of such simple construction that the same may be installed by inexperienced persons and at the same time not produce additional liability to oil leakage.

Other objects and advantages of this invention will be apparent from the following detailed description of a preferred embodiment thereof as illustrated in the accompanying drawings, in which drawings.

Figure 1:
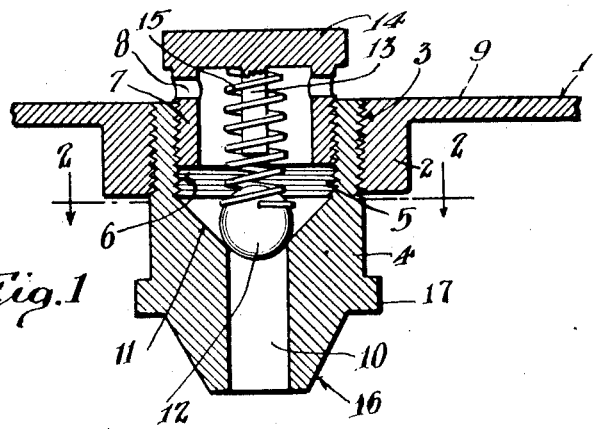
Figure 1 is a simple sectional side elevation of a self-closing crank case drainage plug embodying this invention.
Figure 2:
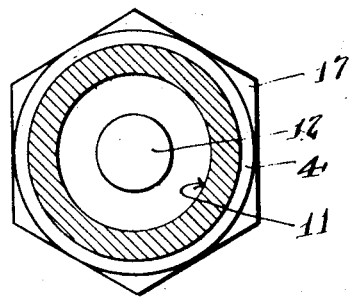
Figure 2 is a sectional top plan view thereof, taken substantially on the line 2—2 of Figure 1.
Figure 3:
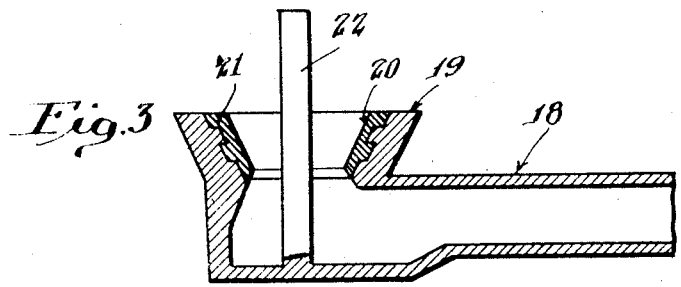
Figure 3 is a sectional side elevation of a plug actuating attachment embodying this invention.
Figure 4:
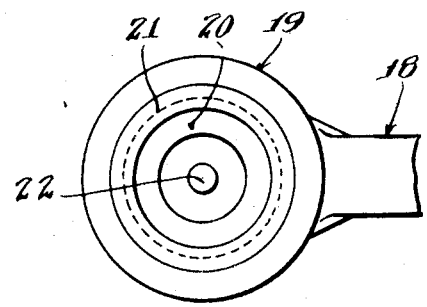
Figure 4 is a top plan view of the plug actuating attachment illustrated in Figure 3.

In the preferred embodiment of this invention, illustrated in the accompanying drawings, 1 illustrates a fragment of an oil reservoir, such as the crank case of a motor vehicle, having a flange 2 formed integral therewith which may be internally threaded as illustrated at 3. A plug 4 is screw-threaded into the flange 2 at the threads 3 thereof. The plug 4 has an enlarged cylindrical recess 5 at its upper end and is threaded as illustrated at 6 to receive a sleeve member 7. The sleeve member 7 has a plurality of ports 8 formed therein which register with the bottom surface 9 of the crank case 1 so that all the lubricant may be drained from the said reservoir through the ports 8. The plug 4 is provided with a central bore 10 which has at its upper end a tapered seat 11 on which a valve member 12, herein illustrated as a ball-valve member, is seated. A pin 13 is formed integral with the upper extension 14 of the sleeve 7 and a compression spring 15 is mounted upon the pin 13 to engage the valve member 12 and maintain the same in position upon the seat 11. The end-face 16 of the plug 4 is tapered for the purpose as will hereinafter appear. An annular flange 17 is formed on the plug 4 immediately above the tapered end-section 16. The flange 17 may be of cylindrical exterior surface or the same may be formed as a hexagon or the like to enable the plug 4 to be readily screw-threaded into the flange 2. In order to actuate the self-closing plug, I provide the following means:

Secured to the end of a hose (not shown), leading from a vacuum pump or source of reduced pressure, is a nozzle 18 which has a frustro-conical head section 19 which provides a frustro-conical seat 20 similar to the tapered end-face 16 of the plug 4.

Mounted in the frustro-conical seat 20 is a suitable facing 21 constructed of leather or like packing material. A pin 22 extends upward through the frustro-conical seat 20 and beyond the end of the nozzle 18 so that the same may be injected into the bore 10 of the plug 4 and be engaged with the valve member 12 to unseat the same, after which the lubricant from the reservoir 1 will drain through the port 8 and port 12 and through the nozzle 18 through the hose connecting the same to the pump (not shown). The annular flange 17 acts as a stop to prevent the nozzle 18 becoming wedged upon the block 4.

Figure 5:
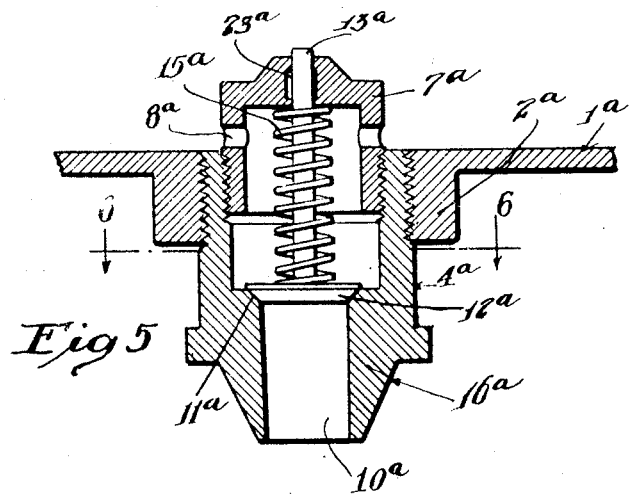
Figure 5 is a sectional side elevation of a modified form of self-closing crank case drainage plug embodying this invention.
Figure 6:
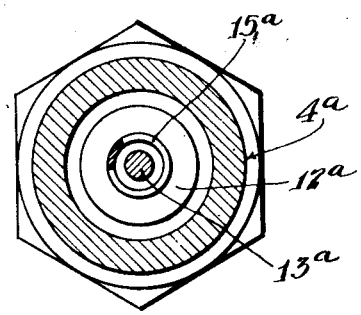
Figure 6 is a sectional top plan view thereof, taken substantially on the line 6—6 of Figure 5.

The modification of this invention illustrated in Figure 5 is entirely similar to the modification above described, except that they have the ball-valve member 12 as illustrated in Figure 1. A disc valve member 12ª is provided which is secured to the end of the pin 13ª and which pin 13ª extends through a bore 23ª formed in the upper end of the sleeve 7ª. The coil spring 15ª is interposed between the end-face of the sleeve 7ª and the upper face of the disc valve member 12ª and normally urges the disc valve member 12ª into engagement upon the valve seat 11ª formed in the upper end of the bore 10ª of the plug 4ª.

Having fully described a preferred embodiment of this invention, it is to be understood that I do not wish to be limited to either of the modifications herein set forth, which may obviously be varied without departing from the spirit of my invention as set forth in the appended claims.

I claim:

1. In a device of the class described, the combination of a plug having a central bore, a valve seat formed in the bore, a valve member mounted on the said seat, a cap member screw-threaded to the said plug, means interposed between the said cap member and the said valve member for yieldably holding the valve member on the said seat, and fluid ports formed through the said cap member in substantial alignment with the top of the said plug for permitting lubricant to flow through the said plug when the valve member is raised from the seat.

2. In a self-closing crank case drainage plug, the combination of a plug having a central bore, a valve seat formed in the bore, a valve member mounted on the seat, a cap member screw-threaded to the plug, means interposed between the cap member and the valve member for yieldably holding the valve member on the seat, the cap member having a plurality of fluid ports formed therein in substantial alignment with the bottom surface of the crank case and with the top of the plug for permitting an unrestricted flow of lubricant through the plug when the valve member is raised from the seat.

3. In a self-closing crank case drainage plug, the combination of a plug adapted to be secured to a low point of the crank case of a motor vehicle engine, the plug having a central bore, a valve seat formed in the bore, a valve member mounted on the seat, a cap member screw-threaded to the plug, means interposed between the cap member and the valve member for yieldably holding the valve member on the seat, and the cap member having a plurality of ports formed in substantial alignment with the bottom surface of the crank case for permitting an unrestricted flow of lubricant from the low point of the crank case through the plug when the valve member is raised from its seat.

4. In a self-closing crank case drainage fitting, the combination of a plug adapted to be screw-threaded into the crank case at a low level thereof, the plug having a central passage with an enlarged cylindrical recess at its upper end, a valve member mounted in said recess, a cap member screw-threaded to the plug in the recess, means interposed between the cap member and the valve member for yieldably holding the valve member in position, the cap member having a plurality of ports formed in substantial alignment with the bottom or lower surface of the crank case to permit an unobstructed flow of lubricant from the low point of the crank case through the plug, and means adapted to be inserted into the bore of the plug member for raising the valve member from its seat.

5. In a self-closing drainage fitting for the crank case of motor vehicles, the combination of a plug having a central passage and an enlarged cylindrical recess at the upper end of the said passage, a valve member mounted in the said recess, a cap member screw-threaded to the plug in the recess and having a plurality of ports in substantial alignment with the inner end of the plug, means interposed between the cap member and the valve member for yieldably holding the valve member in position, and means adapted to be connected at one end with a flexible hose and adapted to be detachably connected at its opposite end with the plug, and having means for raising the valve member from its seat.

Signed at San Francisco this 29th day of January, 1926.

JOHN L. QUINN.